United States Patent [19]

Takahashi

[11] Patent Number: 5,502,796
[45] Date of Patent: Mar. 26, 1996

[54] PRINT DEVICE CAPABLE OF PRINTING A FORMAT SHEET IN WHICH ITEMS ABOUT A PRINT DEVICE AND A DOCUMENT PROCESSOR ARE COMPLETED

[75] Inventor: Kiyoshi Takahashi, Aichi, Japan

[73] Assignee: Brother Kogyo Kabushiki Kaisha, Nagoya, Japan

[21] Appl. No.: 903,767

[22] Filed: Jun. 25, 1992

[30]       Foreign Application Priority Data

Jul. 20, 1991   [JP]   Japan .................................... 3-204791

[51] Int. Cl.[6] .................................................. G06F 15/00
[52] U.S. Cl. .................................. 395/115; 395/113
[58] Field of Search ................................... 395/112, 114, 395/115, 117, 101, 116, 164, 165, 166, 148, 149; 358/406, 444, 434, 400, 401, 403, 404, 405, 437, 435, 436, 438, 440, 407; 355/202, 203, 204, 205, 206, 207; 347/19

[56]                References Cited

U.S. PATENT DOCUMENTS 5,025,397   6/1991   Suzuki ................................ 364/519
5,040,022   8/1991   Kinoshita et al. .................. 355/206
5,179,649   1/1993   Masuzaki et al. .................. 395/117
5,243,691   9/1993   Kuwabara et al. ................. 395/112
5,363,204  11/1994   Millman ............................. 358/406

Primary Examiner—Mark R. Powell
Assistant Examiner—Dov Popovici
Attorney, Agent, or Firm—Oliff & Berridge

[57]                ABSTRACT

A print device of the present invention can print a format sheet in which a user fills in some items which are necessary for a service man to promptly and properly process an inquiry from the user concerning a printed result. In such a print device, when an item name format information print key on an operation panel is operated, first item name format information data are read from a format information memory of a ROM and an item name format is printed on a first page of a printing paper. Next, second item name format information data are read from the format information memory of the ROM and the printer settings are read from a set condition memory stored in a RAM. The data of the second item name format information data and the settings are combined, the combined data are printed on the second page of the printing paper.

16 Claims, 5 Drawing Sheets

Fig.2

| INQUIRY SHEET | | DATE OF INQUIRY |
|---|---|---|
| PRINTER NAME | SERIAL NO. | DATE OF PURCHASE |
| USED PRINT CONTROL LANGUAGE | | |
| APPLICATION NAME | PRINTER MODE | |
| USED PERSONAL COMPUTER | KIND OF INTERFACE | OTHER PERIPHERAL EQUIPMENT |
| PLEASE EXPLAIN CONTENTS OF YOUR INQUIRY | | |
| ADDRESS | | |
| NAME | | |
| PHONE NO. | | |
| FAX NO. | | |

Fig.3

| CONTENTS TO BE SET OF PRINTER ||
|---|---|
| SET ITEM NAME | CONTENTS OF PRINTER SETTING |
| KIND OF INTERFACE | |
| BAUD RATE | |
| CHARACTER LENGTH | |
| PARITY CHECK | |
| STOP BIT | |
| X PARAMETER | |
| DC1, DC3 CODE | |
| ANK CODE | |
| 2 BYTE JIS CODE | |
| ERROR RELEASE MODE | |
| FUNCTION OF CR | |

Fig.5

| CONTENTS TO BE SET OF PRINTER | |
|---|---|
| SET ITEM NAME | CONTENTS OF PRINTER SETTING |
| KIND OF INTERFACE | RS-232C |
| BAUD RATE | 9600 BAUD |
| CHARACTER LENGTH | 8 BIT |
| PARITY CHECK | NONE |
| STOP BIT | 1 BIT |
| X PARAMETER | ON |
| DC1, DC3 CODE | EFFECTIVE |
| ANK CODE | 8 BIT |
| 2 BYTE JIS CODE | BASED ON JIS-1978 |
| ERROR RELEASE MODE | MANUAL |
| FUNCTION OF CR | ONLY CR |

PRINT DEVICE CAPABLE OF PRINTING A FORMAT SHEET IN WHICH ITEMS ABOUT A PRINT DEVICE AND A DOCUMENT PROCESSOR ARE COMPLETED

BACKGROUND OF THE INVENTION

1. Field of the Invention

The invention relates to a print device for printing print data transmitted from an external document processor. In particular, the invention relates to a print device capable of printing a format sheet in which a user completes necessary items such as "model name" and "software name" relating to a print device and a document processor that is necessary for a service man to answer a user inquiry concerning a printing result.

2. Description of Related Art

Recently, document processors, such as personal computers and word processors, have became small and low in price. Therefore, they are more readily purchased and have increased in popularity. At the same time, printers such as dot printers and laser printers for printing print data transmitted from a computer, have also became small and have a low price, so they to have become popular. The printers include a plurality of print control language interpreters and interfaces in order to be able to connect with the variety of available computers.

Therefore, the user can easily buy a computer and printer, connect the purchased computer and printer with the connection cable for communication therebetween, and print various print data created by the computer with the printer.

When print data are transmitted from the computer to the printer, it sometimes happens the print data are not printed by the printer or the printed result is different from the instructed print image, for example, the underline or the expanded characters are not printed or the print layout is not as instructed. In such a case, most of the users inquire directly to the service center of the printer maker by telephone or by facsimile, although there are a few users who read the user's manual for her or himself.

When the user makes an inquiry to the service center, by telephone or by facsimile, the user normally describes only the printed result such that "the print data was not printed" or "it was printed but the printed result was not as instructed". Therefore, the service men must ask a series of questions of the user in order to determine the cause of the trouble, rather than the result. The questions include those directed to identifying the printer, such as identifying the "printer model name", "selected print control language", "kind of interface", and "communication protocols" (such as baud rate; character length; parity check; stop bit; x parameter; DC1, DC3 code; ANK code; and 2 Byte JIS code); those directed to identifying the computer, such as "computer model name", "application software name", "kind of interface", and "communications protocols". Without information of this type, there are some problems that the service center cannot deal with promptly based on the initial user inquiry and there is a possibility that the service system (support system) is inadequate or perceived to be inadequate by the user.

SUMMARY OF THE INVENTION

An object of the invention is to provide a print device capable of printing a format sheet in which a user fills in some of the items which are necessary for a service man to promptly and properly handle the inquiry from the user concerning a printed result.

To achieve this object, in the print device of the invention, a form for printing information thereon related to the print device and information related to the document processing device is stored in the format information memory. The information related to the print device includes, at a minimum, labeled spaces/blocks for entering "model name", "name of the print control language used" and a plurality of predetermined labeled entries for recording information concerning the communication and the print processing of the print device. The information related to the document processing device includes, at a minimum, labeled spaces/blocks for entering "model name" and "name of application software used". The control unit reads the item name format information from the format information memory according to the format print instruction from outside or inside of the device, and instructs the print control unit to print the format information by means of the print unit. As a result, the item name format information is printed on the print medium by the print unit. Then, the user fills in the necessary information in the spaces provided on the format sheet where a plurality of information requirements are printed, and transmits the above format sheet and the inquiry sheet, in which the contents of the inquiry are described to the service center, by facsimile or any other suitable means.

According to the print device of the present invention, as mentioned above, the format information memory and the control unit are provided, and the plurality of requirements concerning the information related to the print device and the information related to the document processing device can be printed using the predetermined format. Therefore, the user has only to transmit to the service center the inquiry sheet in which the contents of the inquiry are described and the format sheet whose items are filled in with the required information. The service man can deal with the inquiry from the user concerning the printed result promptly and properly in accordance with the contents in the format sheet and the inquiry sheet. Therefore, the service system of the printer maker is more responsive to the customer.

BRIEF DESCRIPTION OF THE DRAWINGS

A preferred embodiment of the invention will be described in detail with reference to the following figures wherein:

FIG. 2 illustrates a type format for a system information form;

FIG. 3 illustrates a second type format for obtaining printer information;

FIG. 5 illustrates an example of printer operating conditions as placed into the second type format.

DETAILED DESCRIPTION OF THE PREFERRED EMBODIMENT

A preferred embodiment of the invention will be explained with reference to the attached drawings.

In this embodiment, the invention is applied to a laser printer for printing print data such as characters, symbols, and figures transmitted from an external apparatus, such as a personal computer or a work station.

Figure 1:
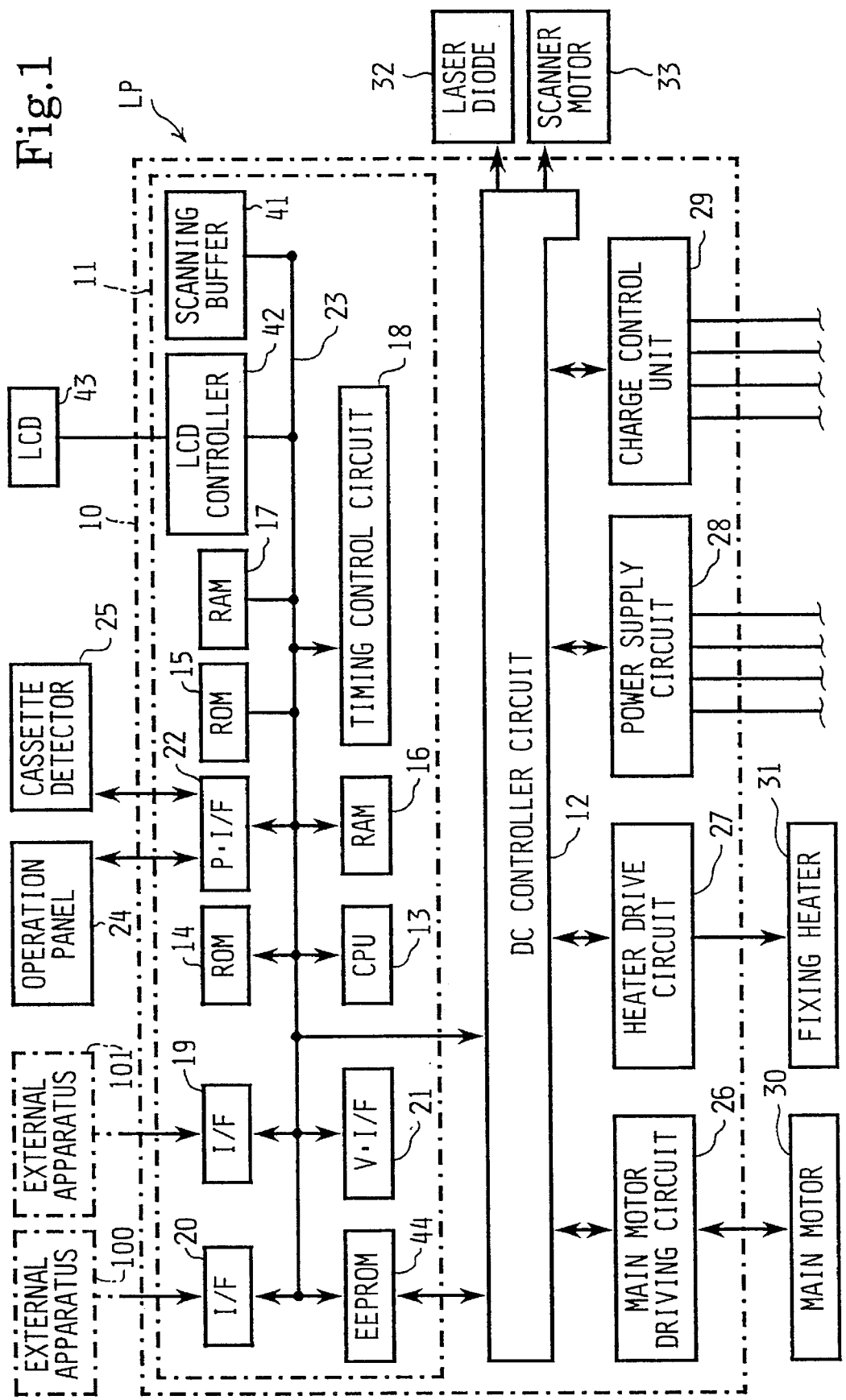
FIG. 1 is a block diagram which shows the control system of a laser printer.

First, a control system of the laser printer LP will be described using the block diagram of FIG. 1. The control system will be explained briefly because it is the same as those generally used in laser printers.

A control unit 10 of the laser printer LP has a video controller 11 and a DC controller circuit 12. The video controller 11 includes a CPU 13, a ROM 14, a ROM 15, a RAM 16, and a RAM 17 for a work memory, a timing control circuit 18, a scanning buffer 41, two kinds of interfaces (I/F) 19, 20 (for instance, RS422A and CENTRONICS), a video interface (V.I/F) 21, a panel interface (P.I/F) 22, and a LCD controller 42. They are connected with each other by a bus 23, such as a data bus. A print control program, a control program for controlling the printing of item name format information described below, two kinds of print control language interpreters A, B for printing the print data supplied from the external apparatuses 100, 101 and various other control programs are stored in the ROM 14. A constitution line data (outline data) which provides the constitution lines of a number of characters and symbols are stored in the ROM 15. The RAM 16 receives the print data transmitted from the external apparatuses and stores the data in a memory buffer up to its predetermined capacity. The RAM 17 contains an area where dot data created based on the data stored in the RAM 16 are stored and a working area, for storing outputs of other processing. The timing control circuit 18 generates a timing signal when data are written into or read from the RAM 16. A couple of the scanning buffers 41 of 4K bytes are constructed from the dual port RAM (FIFO memory). Two kinds of interfaces (I/F) 19, 20 receive the print data such as the character data and the image data transmitted from the external apparatuses 100, 101. The video interface (V.I/F) 21 outputs the printing information, converted into the dot data, to the DC controller circuit 12 one dot after another. The panel interface (P.I/F) 22 receives the signal from a cassette detector 25 which detects the setting of an operation panel 24 and the presence of a paper cassette. The LCD controller 42 drives a liquid crystal display (LCD) 43 which displays the set condition of the control mode of the printer.

The liquid crystal display 43, having an area of only one line, a setting item selection key, a setting key and an item name format information print key are provided in the operation panel 24. Whenever the setting item selection key is repeatedly operated, the plurality of item names such as "used print control language", "kind of interface", and "baud rate" and "character length", relating to the communication protocols, will be cycled to be displayed sequentially. At the same time, a plurality of values that the above setting item can assume are displayed one after another, so that it is possible to select and to set the appropriate value or condition of the item by using the setting key. These display data, of the set items and values to be set, are stored in the ROM 14 and, according to the key operation by the operator, the corresponding display data are read from the ROM 14 and are displayed on the LCD 43. The set condition memory for renewing and storing the selected contents whenever the setting key of the operation panel 24 is operated is provided in the RAM 17. The set condition memory is always powered by a battery. Moreover, the set condition memory can be provided not only in the RAM 17 but also in a nonvolatile memory of Erasable Electrically Programmable ROM (EEPROM) 44 separately installed which is writable and erasable.

In addition, the format information memory storing a first item name format information data and a second item name format information data is provided in the ROM 14. As shown in FIG. 2, the first item name format information data consists of dot data for printing information data related to the print device, to the external apparatus and ruled line data with a predetermined format to complete the form. The information data related to the print device consists of labels for a number of item names concerning the laser printer LP. The information data related to the external apparatus consists of labels for a number of item names concerning external apparatuses 100, 101 such as a connected personal computer, work station or word processor.

As shown in FIG. 3, the second item name format information data consists of the dot data for printing the set item information data and the ruled line data with a predetermined format to complete the form. The set item information data consists of a plurality of set item names which can be set by the laser printer LP. The first item name format information data and the second item name format information data are converted into dot data by the print control language interpreter stored in the ROM 14 using the same processing as processing of the print data transmitted from the outside.

A main motor driving circuit 26 for driving a main motor 30, a heater drive circuit 27 for driving a fixing heater 31, a power supply circuit 28 and a charge control unit 29 for supplying high voltage to charge a photosensitive drum are connected to the DC controller circuit 12 in the control unit 10. A laser diode 32, which is the light emitting element of a semiconductor laser, and a scanner motor 33, for driving a hexahedron mirror to rotate at a high speed, are also connected to the DC controller circuit 12.

Figure 4:
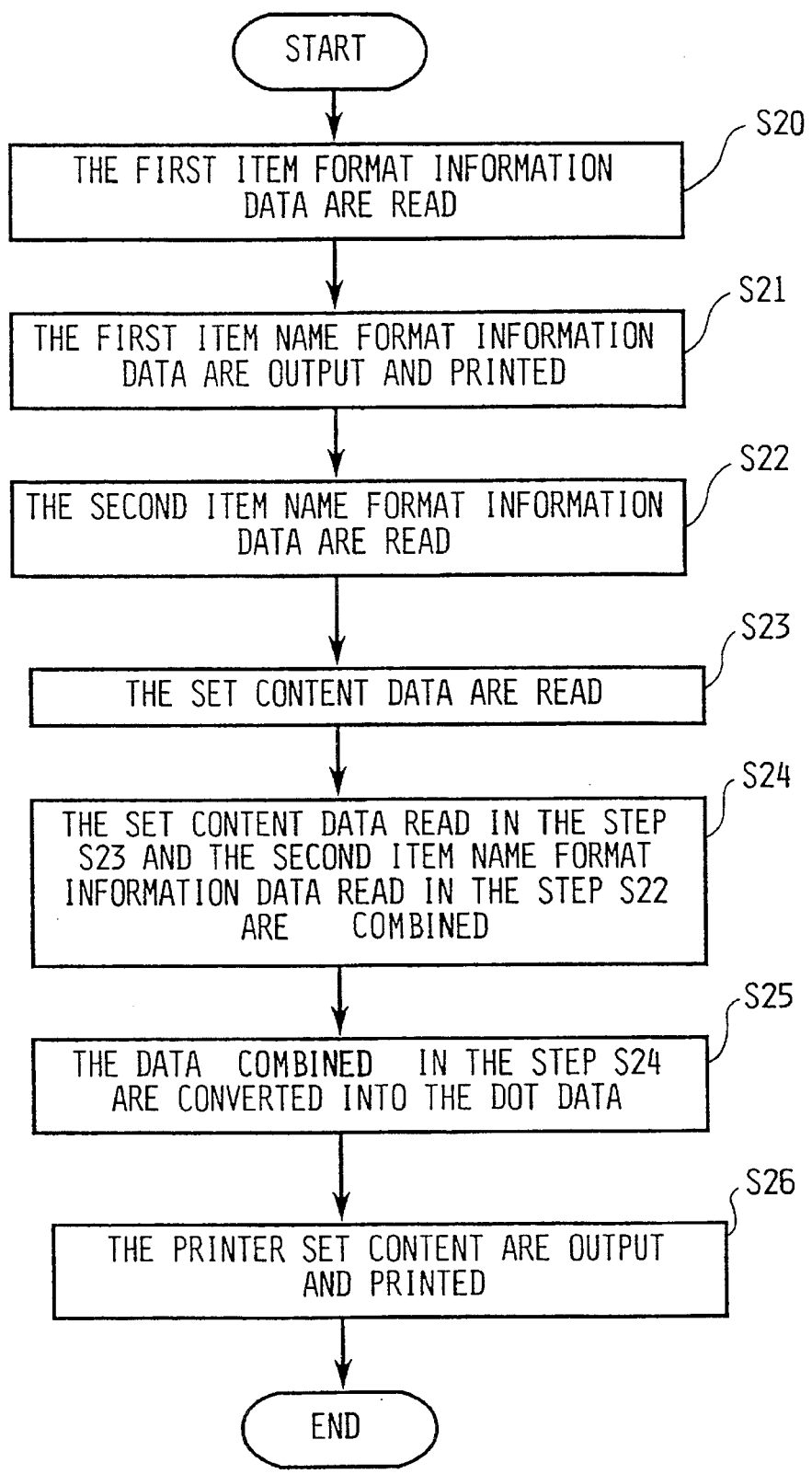
FIG. 4 is a flowchart of a routine of a print control of an item name format information.

Next, the routine for the item name format information print control performed in the video controller 11 of the laser printer LP will be explained with reference to the flowchart of FIG. 4. Each step Si (i=20, 21, 22 . . . ) of the routine is shown in FIG. 4.

When the item name format information print key of the operation panel 24 is operated, the routine is started. First, the first item name format information data are read from the format information memory stored in the ROM 14 (S20). The first item name format information data, which consists of the dot data, are output to the DC controller circuit 12 for the print processing (S21). As a result, the predetermined item name format as shown in FIG. 2 is printed on the first page of the printing paper.

Next, the second item name format information data are read from the format information memory (S22). The set content data stored in the set condition memory in the RAM 17 are read (S23). The set content data read in the step S23 and the second item name format information data read in step S22 are combined using the print control language and the combined data are written in the working area of the RAM 17 (S24). Then, the combined data from step S24 are converted into dot data according to the print control language and stored in the RAM 17 (S25). The dot data produced in S25 are output to the scanning buffer 41 and are converted into serial data which is output to the DC controller circuit 12. As a result, as shown in FIG. 5, the printer settings are printed on the second printing paper within the predetermined item name format (S26).

The user provides the requested information in each item of the item name format sheet printed on the first page and transmits these two item name format sheets to the service center, for instance, by facsimile. The service man can deal with the inquiry concerning the print result promptly and properly in accordance with the contents of these two format sheets. In addition, the database of the printer maker can be updated.

Besides, it is possible to execute this control in accordance with the instructions from the external apparatuses 100, 101. Further, it is possible to separately store the contents of the items concerning the laser printer LP input from the operation panel 24 in the RAM 17 and to combine the contents of the items concerning the printer LP with the first item name format information is printed, and to print the first item name format with the item contents. Moreover, various format types can be used for the first item name format information and the second item name format information. Of course, the invention can also be applied to other type printers such as wire dot printers and ink jet printers.

What is claimed is:

1. A service support system integral to a print device, that receives print data and print instructions from a directly connected external apparatus having an application creating the print data and print instructions, the print device printing system information on a print medium, comprising:

connecting means for receiving the print data output from the external apparatus;

printing means for printing the print data on the print medium based on the print data received by said connecting means;

a format memory for storing format information data for printing forms containing item labels for identifying and providing characteristics of the print device, the external apparatus, an operating system, and a problem summary using a predetermined format;

an operating parameters data memory for storing operating parameters data of the print device and the connecting means for association with an appropriate item label stored in said format memory;

combining means for combining the format information data and the operating parameters data; and control means for reading the format information data from said format memory according to a format print instruction from outside or inside of the print device, and for instructing said printing means to print the forms combined with the operating parameters on the print medium, wherein the forms include at least one labelled space for entry of information written by an operator concerning the external apparatus and a problem encountered.

2. The service support system as claimed in claim 1, wherein said format memory also includes ruled line data other than the item labels.

3. The service support system as claimed in claim 1, wherein the external apparatus includes at least one of a computer, a work station and a word processor and the format information data relating to the external apparatus at least includes the item label for identifying an application name of the application in use.

4. The service support system as claimed in claim 3, wherein the format information data relating to the print device at least includes the item label for identifying a used print control language and a plurality of other predesignated set item labels.

5. The service support system as claimed in claim 4, wherein the format information data relating to the print device further includes the item label for identifying a printer name.

6. The service support system as claimed in claim 5, wherein the format information data relating to the external apparatus further includes the item label for identifying other peripheral equipment.

7. The service support system as claimed in claim 2, wherein the external apparatus includes at least one of a computer, a work station and a word processor and the format information data relating to the external apparatus at least includes the item label for identifying an application name of the application in use.

8. The service support system as claimed in claim 7, wherein the format information data relating to the print device at least includes the item label for identifying a used print control language and a number of other predesignated item labels.

9. The service support system as claimed in claim 8, wherein the format information data relating to the print device further includes the item label for identifying a printer name.

10. The service support system as claimed in claim 9, wherein the format information data relating to the external apparatus further includes the item label for identifying other peripheral equipment.

11. The service support system as claimed in claim 3, wherein the format information data relating to the external apparatus further includes the item label for identifying other peripheral equipment.

12. The service support system as claimed in claim 1, wherein the format information data relating to the print device at least includes the item label for identifying a print control language in use and a number of other predesignated item labels.

13. The service support system as claimed in claim 12, wherein the format information data relating to the print device further includes the item label for identifying a printer name.

14. The service support system as claimed in claim 7, wherein the format information data relating to the external apparatus further includes the item label for identifying other peripheral equipment.

15. The service support system as claimed in claim 2, wherein the format information data relating to the print device at least includes the item label for identifying a print control language in use and a number of other predesignated item labels.

16. The service support system as claimed in claim 15, wherein the format information data relating to the print device further includes the item label for identifying a printer name.

* * * * *